United States Patent
Wright

(10) Patent No.: US 11,479,628 B2
(45) Date of Patent: Oct. 25, 2022

(54) SHELF STABLE, LOW TIN CONCENTRATION, DUAL CURE ADDITIVE MANUFACTURING RESINS

(71) Applicant: Carbon, Inc., Redwood City, CA (US)

(72) Inventor: Andrew Gordon Wright, Mountain View, CA (US)

(73) Assignee: Carbon, Inc., Redwood City, CA (US)

( * ) Notice: Subject to any disclaimer, the term of this patent is extended or adjusted under 35 U.S.C. 154(b) by 125 days.

(21) Appl. No.: 16/759,812

(22) PCT Filed: Oct. 29, 2018

(86) PCT No.: PCT/US2018/057952
§ 371 (c)(1),
(2) Date: Apr. 28, 2020

(87) PCT Pub. No.: WO2019/112707
PCT Pub. Date: Jun. 13, 2019

(65) Prior Publication Data
US 2021/0179761 A1    Jun. 17, 2021

Related U.S. Application Data

(60) Provisional application No. 62/596,293, filed on Dec. 8, 2017.

(51) Int. Cl.
| | |
|---|---|
| C08F 290/06 | (2006.01) |
| B33Y 10/00 | (2015.01) |
| B33Y 70/00 | (2020.01) |
| B29C 64/124 | (2017.01) |
| B29C 64/245 | (2017.01) |
| B29C 64/35 | (2017.01) |
| B33Y 40/20 | (2020.01) |
| C08F 299/06 | (2006.01) |
| C08G 18/10 | (2006.01) |
| C08G 18/22 | (2006.01) |
| C08G 18/73 | (2006.01) |
| B29K 75/00 | (2006.01) |

(52) U.S. Cl.
CPC ........ *C08F 290/067* (2013.01); *B29C 64/124* (2017.08); *B29C 64/245* (2017.08); *B29C 64/35* (2017.08); *B33Y 10/00* (2014.12); *B33Y 40/20* (2020.01); *B33Y 70/00* (2014.12); *C08F 299/065* (2013.01); *C08G 18/10* (2013.01); *C08G 18/222* (2013.01); *C08G 18/73* (2013.01); *B29K 2075/00* (2013.01); *B29K 2995/0065* (2013.01)

(58) Field of Classification Search
CPC ..... B29C 64/124; B29C 64/245; B29C 64/35; B33Y 70/00; B33Y 10/00; B33Y 40/20; C08F 290/067; C08F 299/065; C08G 18/10; C08G 18/222; C08G 18/73
See application file for complete search history.

(56) References Cited

U.S. PATENT DOCUMENTS

| | | |
|---|---|---|
| 3,213,058 A | 10/1965 | Boyle et al. |
| 3,932,342 A | 1/1976 | Nagata et al. |
| 4,075,151 A | 2/1978 | Olstowski |
| 4,785,075 A | 11/1988 | Shimp |
| 5,196,137 A | 3/1993 | Merchant |
| 5,236,637 A | 8/1993 | Hull |
| 5,391,072 A | 2/1995 | Lawton et al. |
| 5,506,007 A | 4/1996 | Williams et al. |
| 5,529,473 A | 6/1996 | Lawton et al. |
| 5,773,403 A | 6/1998 | Hijino et al. |
| 5,824,634 A | 10/1998 | Merchant |
| 5,846,897 A | 12/1998 | Blank et al. |
| 5,965,686 A | 10/1999 | Blank et al. |
| 6,008,179 A | 12/1999 | Flynn et al. |
| 6,063,206 A | 5/2000 | Latta |
| 6,288,018 B1 | 9/2001 | Flynn et al. |
| 6,426,327 B1 | 7/2002 | Flynn et al. |
| 6,646,020 B2 | 11/2003 | Nyberg et al. |
| 6,689,734 B2 | 2/2004 | Doyel et al. |
| 6,699,829 B2 | 3/2004 | Doyel et al. |
| 6,753,304 B1 | 6/2004 | Barthelemy et al. |
| 6,861,475 B2 | 3/2005 | Ilenda et al. |
| 6,916,867 B2 | 7/2005 | Gugumus |
| 7,144,955 B2 | 12/2006 | Grace et al. |
| 7,157,586 B2 | 1/2007 | Wood et al. |
| 7,183,248 B2 | 2/2007 | Manning, Jr. |
| 7,438,846 B2 | 10/2008 | John |
| 7,625,977 B2 | 12/2009 | Lutz et al. |
| 7,642,316 B2 | 1/2010 | Rego et al. |

(Continued)

FOREIGN PATENT DOCUMENTS

| | | |
|---|---|---|
| EP | 3127931 | 2/2017 |
| WO | 2015/164234 | 10/2015 |
| WO | 2016/133759 | 8/2016 |
| WO | 2016/145050 | 9/2016 |
| WO | 2016/145182 | 9/2016 |

OTHER PUBLICATIONS

International Search Report and Written Opinion corresponding to PCT/US2018/057952, dated Jan. 22, 2019 (10 pp).
Janusziewcz et al. "Layerless fabrication with continuous liquid interface production" Proceedings of the National Academy of Sciences USA, 113(42):11703-11708 (2016).
Tubleston et al "Continuous liquid interface production of 3D objects" Science, 347(6228):1349-1352 (2015).

*Primary Examiner* — Nahida Sultana
(74) *Attorney, Agent, or Firm* — Myers Bigel, P.A.

(57) ABSTRACT

Provided herein are methods of making (meth)acrylate blocked polyurethanes with zirconium catalysts, dual cure resins containing (meth)acrylate blocked polyurethanes and zirconium catalysts, methods of using the same in additive manufacturing, and products made therefrom.

12 Claims, No Drawings

(56) References Cited

U.S. PATENT DOCUMENTS

| | | | |
|---|---|---|---|
| 7,695,643 B2 | 4/2010 | Fritzsche et al. | |
| 7,892,474 B2 | 2/2011 | Shkolnik et al. | |
| 7,897,558 B1 | 3/2011 | Arafat | |
| 8,088,245 B2 | 1/2012 | Lutz et al. | |
| 8,110,135 B2 | 2/2012 | El-Siblani | |
| 8,378,053 B2 | 2/2013 | Shigemori et al. | |
| 8,765,108 B2 | 7/2014 | Lalleman | |
| 9,023,782 B2 | 5/2015 | Peitersen et al. | |
| 9,068,152 B2 | 6/2015 | Klinkhammer et al. | |
| 9,090,765 B2 | 7/2015 | Schall et al. | |
| 9,095,787 B2 | 8/2015 | Panandiker et al. | |
| 9,120,997 B2 | 9/2015 | Sadlowski et al. | |
| 9,121,000 B2 | 9/2015 | Burkinshaw et al. | |
| 9,175,248 B2 | 11/2015 | Klinkhammer et al. | |
| 9,198,847 B2 | 12/2015 | Peffly et al. | |
| 9,200,108 B2 | 12/2015 | Bruchmann et al. | |
| 9,205,601 B2 | 12/2015 | Desimone et al. | |
| 9,211,678 B2 | 12/2015 | Desimone et al. | |
| 9,216,546 B2 | 12/2015 | Desimone et al. | |
| 9,453,142 B2 | 9/2016 | Rolland et al. | |
| 9,598,606 B2 | 3/2017 | Rolland et al. | |
| 9,676,963 B2 | 6/2017 | Rolland et al. | |
| 9,752,056 B2 | 9/2017 | Berger et al. | |
| 9,796,693 B2 | 10/2017 | Bossaert et al. | |
| 2004/0067318 A1 | 4/2004 | Jones et al. | |
| 2007/0225443 A1* | 9/2007 | Skelskey | B29C 70/50 |
| | | | 524/436 |
| 2013/0202392 A1 | 8/2013 | Morimoto et al. | |
| 2013/0292862 A1 | 11/2013 | Joyce | |
| 2013/0295212 A1 | 11/2013 | Chen et al. | |
| 2014/0371406 A1 | 12/2014 | Esbelin et al. | |
| 2015/0184039 A1 | 7/2015 | Lutz et al. | |
| 2015/0215430 A1 | 7/2015 | Votour | |
| 2015/0240113 A1 | 8/2015 | Pratt et al. | |
| 2017/0113416 A1* | 4/2017 | DeSimone | B33Y 30/00 |
| 2017/0120515 A1* | 5/2017 | Rolland | B29C 64/129 |
| 2019/0023917 A1* | 1/2019 | Drazba | C09D 11/101 |
| 2020/0038907 A1* | 2/2020 | Johnson | B05D 1/007 |
| 2020/0108550 A1* | 4/2020 | Chen | B29C 64/135 |
| 2021/0332178 A1* | 10/2021 | Wright | B29C 64/30 |
| 2022/0168077 A1* | 6/2022 | Herring | A61K 6/62 |

* cited by examiner

SHELF STABLE, LOW TIN CONCENTRATION, DUAL CURE ADDITIVE MANUFACTURING RESINS

CROSS REFERENCE TO RELATED APPLICATIONS

This application is a 35 U.S.C. § 371 national phase application of International Application Serial No. PCT/US2018/057952, filed Oct. 29, 2018, which claims priority to U.S. Provisional Application Ser. No. 62/596,293, filed Dec. 8, 2017, the entire contents of which are hereby incorporated by reference.

FIELD OF THE INVENTION

The present invention concerns additive manufacturing resins, methods of making and using the same, and products produced therefrom.

BACKGROUND OF THE INVENTION

A group of additive manufacturing techniques sometimes referred to as "stereolithography" create a three-dimensional object by the sequential polymerization of a light polymerizable resin. Such techniques may be "bottom-up" techniques, where light is projected into the resin onto the bottom of the growing object through a light transmissive window, or "top-down" techniques, where light is projected onto the resin on top of the growing object, which is then immersed downward into the pool of resin.

The recent introduction of a more rapid stereolithography technique known as continuous liquid interface production (CLIP), coupled with the introduction of "dual cure" resins for additive manufacturing, has expanded the usefulness of stereolithography from prototyping to manufacturing (see, e.g., U.S. Pat. Nos. 9,211,678; 9,205,601; and 9,216,546 to DeSimone et al.; and also J. Tumbleston, D. Shirvanyants, N. Ermoshkin et al., Continuous liquid interface production of 3D Objects, *Science* 347, 1349-1352 (2015); see also Rolland et al., U.S. Pat. Nos. 9,676,963, 9,453,142 and 9,598,606). These developments have generated a need for a greater variety of resins with properties appropriate for a greater variety of additively manufactured products.

SUMMARY OF THE INVENTION

Some dual cure additive manufacturing resins contain (meth)acrylate blocked polyurethanes, or "ABPUs," which are themselves produced with bismuth catalysts. Unfortunately, the bismuth catalysts can cause resins to become hazy over time, as the catalyst interacts with water and (apparently) precipitates.

One solution is to reduce the amount of residual water in the resin. However, reducing residual water to less than 300 parts per million (ppm) is technically difficult and potentially expensive.

Another approach is to switch from a bismuth catalyst to a tin catalyst. However, tin catalysts leave residual tin in resins produced therefrom, and for some uses, tin is unacceptable in the final product. Residual tin in final parts can also result in accelerated ester group hydrolysis over time, decreasing the long-term durability, particularly exterior durability.

Additionally, both bismuth and tin catalysts are known for catalyzing the isocyanate-water reaction, resulting in high molecular weight ABPUs with larger polydispersity indices and is undesired in some circumstances.

A further problem is that the catalyst used to make the ABPU can itself catalyze the reaction of a dual cure resin containing an ABPU with polyols and/or polyamines in the resin (e.g., when "A" and "B" precursor resins are combined), increasing the viscosity of the resin, and consequently decreasing its "printability" during additive manufacturing.

We have unexpectedly found that zirconium catalysts can be used to make an ABPU, which can in turn be used to make precursor resins that have substantially reduced viscosities than those prepared by tin catalysts, even under low water content conditions, resulting in lower dual cure resin viscosities, thus improving handling and printability. Additionally, when the zirconium-based ABPU is combined with a polyol and/or polyamine, the resin maintains a lower viscosity over the time of the printing process, in spite of the residual zirconium catalyst contained therein.

Accordingly, aspects of the present invention include: methods of making ABPUs with zirconium catalysts, dual cure resins containing ABPUs and zirconium catalysts, methods of using the same in additive manufacturing, and products made therefrom.

The foregoing and other objects and aspects of the present invention are explained in greater detail in the drawings herein and the specification set forth below. The disclosures of all United States patent references cited herein are to be incorporated herein by reference.

DETAILED DESCRIPTION OF ILLUSTRATIVE EMBODIMENTS

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

As used herein, the term "and/or" includes any and all possible combinations of one or more of the associated listed items, as well as the lack of combinations when interpreted in the alternative ("or").

1. Resins and Methods of Making.

Provided herein according to some embodiments is a resin useful for additive manufacturing, comprising:

(a) a (meth)acrylate blocked polyurethane (ABPU) prepolymer (e.g., 30%-99% by weight);

(b) a free radical photoinitiator (e.g., 0.1%-5% by weight);

(c) from 1 or 50 parts per million (ppm) to 200, 500 or 1000 ppm of a zirconium catalyst;

(d) optionally (but in some embodiments preferably) a comonomer (e.g., 0.1%-70% by weight);

(e) optionally (but in some embodiments preferably) a radical polymerization inhibitor (e.g., 0.001-5% by weight);

(f) not more than 1, 10, 100, 200 or 1000 ppm of a tin catalyst;

(g) optionally but preferably not more than 300 or 500 ppm water; and (h) optionally (but in some embodiments preferably) a filler, dye, pigment, toughener, and/or accelerator (e.g., 50 ppm to 30% by weight).

In some embodiments, the resin has a viscosity of 100 to 50,000 Centipoise at 25 degrees Centigrade.

In some embodiments, the resin is a dual cure resin. Such resins are described in, for example, Rolland et al., U.S. Pat. Nos. 9,676,963, 9,598,606, and 9,453,142, the disclosures of which are incorporated herein by reference. In some embodiments, the resin is a dual cure resin that comprises a polyol, polyamine, or a combination thereof.

In some embodiments, resins as taught herein may be made, for example, by (a) reacting a polyisocyanate with a polyol in the presence of a zirconium catalyst to produce a first reaction product; and then (b) reacting the first reaction product with an amine(meth)acrylate monomer blocking agent (optionally in the presence of said zirconium catalyst) to produce a second reaction product comprising a (meth) acrylate blocked polyurethane (ABPU). In some embodiments, the method includes (c) combining the second reaction product with (i) a free radical photoinitiator and (ii) optionally (but in some embodiments preferably) a comonomer, to produce said precursor resin. In some embodiments, the method may include adding a radical polymerization inhibitor before, during or after any one of the reacting or combining steps. In some embodiments, the method may include adding a reactive diluent or non-reactive diluent before, during or after any one of the reacting or combining steps.

In some embodiments, the reacting step (a) is carried out in the absence of a tin catalyst under nonaqueous conditions.

"Polyisocyanate" includes, but is not limited to, 1,6-diisocyanatohexane (HDI), methylene diphenyl diisocyanate (MDI), toluene diisocyanate (TDI), para-phenyl diisocyanate (PPDI), 4,4'-dicyclohexylmethane-diisocyanate (HMDI), isophorone diisocyanate (IPDI), triphenylmethane-4,4'4"-triisocyanate, toluene-2,4,6-triyl triisocyanate, 1,3,5-triazine-2,4,6-triisocyanate, ethyl ester L-lysine triisocyanate, etc., and combinations thereof. Numerous additional examples are known and are described in, for example, U.S. Pat. Nos. 9,200,108; 8,378,053; 7,144,955; 4,075,151, 3,932,342, and in US Patent Application Publication Nos. US 20040067318 and US 20140371406, the disclosures of all of which are incorporated by reference herein in their entirety.

"Polyol" includes, but is not limited to, a polyether, polyester, or polybutadiene diol (e.g., poly(tetrahydrofuran)), etc., including combinations thereof.

"Zirconium catalyst" includes, but is not limited to, zirconium tetraacetylacetonate, zirconium dionate (see, e.g., U.S. Pat. Nos. 5,846,897 and 9,752,056), etc., including combinations thereof.

"Free radical photoinitiator" as used herein includes type I free radical photoinitiators, such as phosphineoxide (TPO) or hydroxyacetophenone (HAP), and/or type II free radical photoinitiators, such as a benzophenone photoinitiator (optionally but preferably in combination with a co-initiator (e.g., an alcohol or amine)). Particular examples include, but are not limited to, diphenyl(2,4,6-trimethylbenzoyl)phosphine oxide (TPO), diphenylphosphinyl(2,4,6-trimethylphenyl)methanone; benzophenone; substituted benzophenones; acetophenone; substituted acetophenones; benzoin; benzoin alkyl esters; xanthone; substituted xanthones; diethoxy-acetophenone; benzoin methyl ether; benzoin ethyl ether; benzoin isopropyl ether; diethoxyxanthone; chloro-thioxanthone; N-methyl diethanol-amine-benzophenone; 2-hydroxy-2-methyl-1-phenyl-propan-1-one; 2-benzyl-2-(dimethylamino)-1-[4-(4-morpholinyl)phenyl]-1-butanone; and mixtures thereof. See, e.g., U.S. Pat. No. 9,090,765 to Henkel.

A "radical polymerization inhibitor" includes, but is not limited to, 4-methoxyphenol (also known as monomethyl ether hydroquinone (MEHQ), or mequinol), 4-ethoxyphenol, 4-propoxyphenol, 4-butoxyphenol 4-heptoxyphenol, 2,6-di-tert-butyl-4-methylphenol (see, e.g., U.S. Pat. No. 9,796,693), etc., including combinations thereof.

An "amine (meth)acrylate monomer blocking agent" includes, but is not limited to, tertiary-butylaminoethyl methacrylate (TBAEMA), tertiary pentylaminoethyl methacrylate (TPAEMA), tertiary hexylaminoethyl methacrylate (THAEMA), tertiary-butylaminopropyl methacrylate (TBAPMA), acrylate analogs thereof, or a mixture thereof (see, e.g., US Patent Application Publication No. 20130202392).

"Comonomer" includes, but is not limited to, isobornyl methacrylate (IBOMA), lauryl methacrylate, poly(ethylene glycol)dimethacrylate, etc., including combinations thereof. In some embodiments, the comonomer is a reactive diluent. Diluents as known in the art are compounds used to reduce viscosity in a resin composition. Reactive diluents undergo reaction to become part of the polymeric network. In some embodiments, the reactive diluent may react at approximately the same rate as other reactive monomers and/or prepolymers in the composition. Reactive diluents may include aliphatic reactive diluents, aromatic reactive diluents, and cycloaliphatic reactive diluents. Examples include, but are not limited to, isobornyl acrylate, isobornyl methacrylate, lauryl acrylate, lauryl methacrylate, 2-ethyl hexyl methacarylate, 2-ethyl hexyl acrylate, di(ethylene glycol) methyl ether methacrylate, phenoxyethyl methacrylate, hydroxyethyl acrylate, hydroxyethyl methacrylate, dimethyl(aminoethyl) methacrylate, butyl acrylate, butyl methacrylate, cyclohexyl methacrylate, tetrahydrofurfuryl methacrylate, tert-butylaminoethyl methacrylate, and combinations thereof.

Additional resin ingredients. The liquid resin or polymerizable material can have (among other things) solid particles suspended or dispersed therein. Any suitable solid particle can be used, depending upon the end product being fabricated. The particles can be metallic, organic/polymeric, inorganic, or composites or mixtures thereof. The particles can be nonconductive, semi-conductive, or conductive (including metallic and non-metallic or polymer conductors); and the particles can be magnetic, ferromagnetic, paramagnetic, or nonmagnetic. The particles can be of any suitable shape, including spherical, elliptical, cylindrical, etc. The particles can be of any suitable size (for example, ranging from 1 nm to 20 μm average diameter).

The particles can comprise an active agent or detectable compound as described below, though these may also be provided dissolved or solubilized in the liquid resin as also discussed below. For example, magnetic or paramagnetic particles or nanoparticles can be employed.

The liquid resin can have additional ingredients solubilized therein, including pigments, dyes, diluents, active compounds or pharmaceutical compounds, detectable compounds (e.g., fluorescent, phosphorescent, radioactive), etc., again depending upon the particular purpose of the product being fabricated. Examples of such additional ingredients include, but are not limited to, proteins, peptides, nucleic acids (DNA, RNA) such as siRNA, sugars, small organic compounds (drugs and drug-like compounds), etc., including combinations thereof.

Dyes/non-reactive light absorbers. In some embodiments, polymerizable liquids for carrying out the present invention include a non-reactive pigment or dye that absorbs light, particularly UV light. Suitable examples of such light absorbers include, but are not limited to: (i) titanium dioxide (e.g., included in an amount of from 0.05 or 0.1 to 1 or 5 percent by weight), (ii) carbon black (e.g., included in an amount of from 0.05 or 0.1 to 1 or 5 percent by weight), and/or (iii) an organic ultraviolet light absorber such as a hydroxybenzophenone, hydroxyphenylbenzotriazole, oxanilide, benzophenone, thioxanthone, hydroxyphenyltriazine, and/or benzotriazole ultraviolet light absorber (e.g., Mayzo BLS® 1326) (e.g., included in an amount of 0.001 or 0.005 to 1, 2 or 4 percent by weight). Examples of suitable organic ultraviolet light absorbers include, but are not limited to, those described in U.S. Pat. Nos. 3,213,058; 6,916,867; 7,157,586; and 7,695,643, the disclosures of which are incorporated herein by reference.

Fillers. Any suitable filler may be used in connection with the present invention, depending on the properties desired in the part or object to be made. Thus, fillers may be solid or liquid, organic or inorganic, and may include reactive and non-reactive rubbers: siloxanes, acrylonitrile-butadiene rubbers; reactive and non-reactive thermoplastics (including but not limited to: poly(ether imides), maleimide-styrene terpolymers, polyarylates, polysulfones and polyethersulfones, etc.) inorganic fillers such as silicates (such as talc, clays, silica, mica), glass, carbon nanotubes, graphene, cellulose nanocrystals, etc., including combinations of all of the foregoing. Suitable fillers include tougheners, such as core-shell rubbers, as discussed below.

Tougheners. One or more polymeric and/or inorganic tougheners can be used as a filler in the present invention. See generally US Patent Application Publication No. 20150215430. The toughener may be uniformly distributed in the form of particles in the cured product. The particles could be less than 5 microns (µm) in diameter. Such tougheners include, but are not limited to, those formed from elastomers, branched polymers, hyperbranched polymers, dendrimers, rubbery polymers, rubbery copolymers, block copolymers, core-shell particles, oxides or inorganic materials such as clay, polyhedral oligomeric silsesquioxanes (POSS), carbonaceous materials (e.g., carbon black, carbon nanotubes, carbon nanofibers, fullerenes), ceramics and silicon carbides, with or without surface modification or functionalization.

Core-shell rubbers. Core-shell rubbers are particulate materials (particles) having a rubbery core. Such materials are known and described in, for example, US Patent Application Publication No. 20150184039, as well as US Patent Application Publication No. 20150240113, and U.S. Pat. Nos. 6,861,475, 7,625,977, 7,642,316, 8,088,245, and elsewhere. In some embodiments, the core-shell rubber particles are nanoparticles (i.e., having an average particle size of less than 1000 nanometers (nm)). Generally, the average particle size of the core-shell rubber nanoparticles is less than 500 nm, e.g., less than 300 nm, less than 200 nm, less than 100 nm, or even less than 50 nm. Typically, such particles are spherical, so the particle size is the diameter; however, if the particles are not spherical, the particle size is defined as the longest dimension of the particle. Suitable core-shell rubbers include, but are not limited to, those sold by Kaneka Corporation under the designation Kaneka Kane Ace, including the Kaneka Kane Ace 15 and 120 series of products, including Kaneka Kane Ace MX 120, Kaneka Kane Ace MX 153, Kaneka Kane Ace MX 154, Kaneka Kane Ace MX 156, Kaneka Kane Ace MX170, Kaneka Kane Ace MX 257, and Kaneka Kane Ace MX 120 core-shell rubber dispersions, and mixtures thereof.

Organic diluents. In some embodiments, diluents for use in the present invention are preferably reactive organic diluents; that is, diluents that will degrade, isomerize, cross-react, or polymerize, with themselves or a light polymerizable component, during the additive manufacturing step. In general, the diluent(s) are included in an amount sufficient to reduce the viscosity of the polymerizable liquid or resin (e.g., to not more than 15,000, 10,000, 6,000, 5,000, 4,000, or 3,000 centipoise at 25 degrees Centigrade). Suitable examples of diluents include, but are not limited to, N,N-dimethylacrylamide, N-vinyl-2-pyrrolidone, and N-vinyl formamide, or a mixture if two or more thereof. The diluent may be included in the polymerizable liquid in any suitable amount, typically from 1, 5 or 10 percent by weight, up to about 30 or 40 percent by weight, or more.

Accelerators. In some embodiments, the liquid may include a deoxygenating compound as an accelerator of stereolithography (particularly CLIP). An example of a suitable such accelerator is triphenylphosphine.

2. Production by Additive Manufacturing.

Polymerizable liquids or resins as described herein may be used to make three-dimensional objects, in a "light" cure (typically by additive manufacturing) which in some embodiments generates a "green" intermediate object, followed in some embodiments by a second (typically heat) cure of that intermediate object.

Techniques for additive manufacturing are known. Suitable techniques include bottom-up or top-down additive manufacturing, generally known as stereolithography. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and US Patent Application Publication No. 2013/0295212 to Chen et al. The disclosures of these patents and applications are incorporated by reference herein in their entirety.

In some embodiments, the intermediate object is formed by continuous liquid interface production (CLIP). CLIP is known and described in, for example, PCT Application Nos. PCT/US2014/015486 (U.S. Pat. No. 9,211,678); PCT/US2014/015506 (U.S. Pat. No. 9,205,601), PCT/US2014/015497 (9,216,546), and in J. Tumbleston, D. Shirvanyants, N. Ermoshkin et al., Continuous liquid interface production of 3D Objects, Science 347, 1349-1352 (2015). See also R. Janusziewcz et al., Layerless fabrication with continuous liquid interface production, *Proc. Natl. Acad. Sci. USA* 113, 11703-11708 (2016). In some embodiments, CLIP employs features of a bottom-up three-dimensional fabrication as described above, but the irradiating and/or said advancing steps are carried out while also concurrently maintaining a stable or persistent liquid interface between the growing object and the build surface or window, such as by: (i) continuously maintaining a dead zone of polymerizable liquid in contact with said build surface, and (ii) continuously maintaining a gradient of polymerization zone (such as an active surface) between the dead zone and the solid polymer and in contact with each thereof, the gradient of polymerization zone comprising the first component in partially-cured form. In some embodiments of CLIP, the optically transparent member comprises a semipermeable member (e.g., a fluoropolymer), and the continuously maintaining a dead zone is carried out by feeding an inhibitor of polymerization through the optically transparent member, thereby creating a gradient of inhibitor in the dead zone and optionally in at least a portion of the gradient of polymerization zone. Other approaches for carrying out CLIP that can be used in the present invention and potentially obviate the need for a semipermeable "window" or window structure include utilizing a liquid interface comprising an immiscible liquid (see L. Robeson et al., WO 2015/164234), generating oxygen as an inhibitor by electrolysis (see I Craven et al., WO 2016/133759), and incorporating magnetically positionable particles to which the photoactivator is coupled into the polymerizable liquid (see J. Rolland, WO 2016/145182).

After the intermediate three-dimensional object is formed, it is optionally washed, optionally dried (e.g., air dried) and/or rinsed (in any sequence). It is then further cured, preferably by heating (although further curing may in some embodiments be concurrent with the first cure, or may be by different mechanisms such as contacting to water, as described in U.S. Pat. No. 9,453,142 to Rolland et al.).

3. Washing.

Objects as described above can be washed in any suitable apparatus, preferably with a wash liquid. Wash liquids that may be used to carry out the present invention include, but are not limited to, water, organic solvents, and combinations thereof (e.g., combined as co-solvents), optionally containing additional ingredients such as surfactants, chelants (ligands), enzymes, borax, dyes or colorants, fragrances, etc., including combinations thereof. The wash liquid may be in any suitable form, such as a solution, emulsion, dispersion, etc.

In some preferred embodiments, where the residual resin has a boiling point of at least 90 or 100° C. (e.g., up to 250 or 300° C., or more), the wash liquid has a boiling point of at least 30° C., but not more than 80 or 90° C. Boiling points are given herein for a pressure of 1 bar or 1 atmosphere.

Examples of organic solvents that may be used as a wash liquid, or as a constituent of a wash liquid, include, but are not limited to, alcohol, ester, dibasic ester, ketone, acid, aromatic, hydrocarbon, ether, dipolar aprotic, halogenated, and base organic solvents, including combinations thereof. Solvents may be selected based, in part, on their environmental and health impact (see, e.g., GSK Solvent Selection Guide 2009).

Examples of alcohol organic solvents that may be used in the present invention include, but are not limited to, aliphatic and aromatic alcohols such as 2-ethyl hexanol, glycerol, cyclohexanol, ethylene glycol, propylene glycol, di-propylene glycol, 1,4-butanediol, isoamyl alcohol, 1,2-propanediol, 1,3-propanediol, benzyl alcohol, 2-pentanol, 1-butanol, 2-butanol, methanol, ethanol, t-butanol, 2-propanol, 1-propanol, 2-methoxyethanol, tetrahydrofuryl alcohol, benzyl alcohol, etc., including combinations thereof. In some embodiments, a C1-C6 or C1-C4 aliphatic alcohol is preferred.

Examples of ester organic solvents that may be used to carry out the present invention include, but are not limited to, t-butyl acetate, n-octyl acetate, butyl acetate, ethylene carbonate, propylene carbonate, butylenes carbonate, glycerol carbonate, isopropyl acetate, ethyl lactate, propyl acetate, dimethyl carbonate, methyl lactate, ethyl acetate, ethyl propionate, methyl acetate, ethyl formate etc., including combinations thereof.

Examples of dibasic ester organic solvents include, but are not limited to, dimethyl esters of succinic acid, glutaric acid, adipic acid, etc., including combinations thereof.

Examples of ketone organic solvents that may be used to carry out the present invention include, but are not limited to, cyclohexanone, cyclopentanone, 2-pentanone, 3-pentanone, methylisobutyl ketone, acetone, methylethyl ketone, etc., including combinations thereof.

Examples of acid organic solvents that may be used to carry out the present invention include, but are not limited to, propionic acid, acetic anhydride, acetic acid, etc., including combinations thereof.

Examples of aromatic organic solvents that may be used to carry out the present invention include, but are not limited to, mesitylene, cumene, p-xylene, toluene, benzene, etc., including combinations thereof.

Examples of hydrocarbon (i.e., aliphatic) organic solvents that may be used to carry out the present invention include, but are not limited to, cis-decalin, ISOPAR™ G, isooctane, methyl cyclohexane, cyclohexane, heptane, pentane, methylcyclopentane, 2-methylpentane, hexane, petroleum spirit, etc., including combinations thereof.

Examples of ether organic solvents that may be used to carry out the present invention include, but are not limited to, di(ethylene glycol), ethoxybenzene, tri(ethylene glycol), sulfolane, DEG monobutyl ether, anisole, diphenyl ether, dibutyl ether, t-amyl methyl ether, t-butylmethyl ether, cyclopentyl methyl ether, t-butyl ethyl ether, 2-methyltetrahydrofuran, diethyl ether, bis(2-methoxyethyl) ether, dimethyl ether, 1,4-dioxane, tetrahydrofuran, 1,2-dimethoxyethane, diisopropyl ether, etc., including combinations thereof.

Examples of dipolar aprotic organic solvents that may be used to carry out the present invention include, but are not limited to, dimethylpropylene urea, dimethyl sulphoxide, formamide, dimethyl formamide, N-methylformamide, N-methyl pyrrolidone, propanenitrile, dimethyl acetamide, acetonitrile, etc., including combinations thereof.

Examples of halogenated organic solvents that may be used to carry out the present invention include, but are not limited to, 1,2-dichlorobenzene, 1,2,4-trichlorobenzene, chlorobenzene, trichloroacetonitrile, chloroacetic acid, trichloroacetic acid, perfluorotoluene, perfluorocyclohexane, carbon tetrachloride, dichloromethane, perfluorohexane, fluorobenzene, chloroform, perfluorocyclic ether, trifluoroacetic acid, trifluorotoluene, 1,2-dichloroethane, 2,2,2-trifluoroethanol, etc., including combinations thereof.

Examples of base organic solvents that may be used to carry out the present invention include, but are not limited to, N,N-dimethylaniline, triethylamine, pyridine, etc., including combinations thereof.

Examples of other organic solvents that may be used to carry out the present invention include, but are not limited to, nitromethane, carbon disulfide, etc., including combinations thereof.

Examples of surfactants include, but are not limited to, anionic surfactants (e.g., sulfates, sulfonates, carboxylates, and phosphate esters), cationic surfactants, zwitterionic surfactants, nonionic surfactants, etc., including combinations thereof. Common examples include, but are not limited to, sodium stearate, linear alkylbenzenesulfonates, lignin sulfonates, fatty alcohol ethoxylates, alkylphenol ethoxylates, etc., including combinations thereof. Numerous examples additional examples of suitable surfactants are known, some of which are described in U.S. Pat. Nos. 9,198,847, 9,175,248, 9,121,000, 9,120,997, 9,095,787, 9,068,152, 9,023,782, and 8,765,108.

Examples of chelants (chelating agents) include, but are not limited to, ethylenediamine tetraacetic acid, phosphates, nitrilotriacetic acid (NTA), citrates, silicates, and polymers of acrylic and maleic acid.

Examples of enzymes that may be included in the wash liquid include, but are not limited to, proteases, amylases, lipases, cellulases, etc., including mixtures thereof. See, e.g., U.S. Pat. Nos. 7,183,248, 6,063,206, In some embodiments, the wash liquid can be an aqueous solution of ethoxylated alcohol, sodium citrate, tetrasodium N,N-bis(carboxymethyl)-L-glutamate, sodium carbonate, citric acid, and isothiazolinone mixture. One particular example thereof is SIMPLE GREEN® all purpose cleaner (Sunshine Makers Inc., Huntington Beach, Calif., USA), used per se or mixed with additional water.

In some embodiments, the wash liquid can be an aqueous solution comprised of of 2-butoxyethanol, sodium metasilicate, and sodium hydroxide. One particular example thereof is PURPLE POWER™ degreaser/cleaner (Aiken Chemical Co., Greenville, S.C., USA), used per se or mixed with additional water.

In some embodiments, the wash liquid can be ethyl lactate, alone or with a co-solvent. One particular example thereof is BIO-SOLV™ solvent replacement (Bio Brands LLC, Cinnaminson, N.J., USA), used per se or mixed with water.

In some embodiments, the wash liquid consists of a 50:50 (volume:volume) solution of water and an alcohol organic solvent such as isopropanol (2-propanol).

Examples of hydrofluorocarbon solvents that may be used to carry out the present invention include, but are not limited to, 1,1,1,2,3,4,4,5,5,5-decafluoropentane (Vertrel® XF, DuPont™ Chemours), 1,1,1,3,3-pentafluoropropane, 1,1,1,3,3-pentafluorobutane, etc.

Examples of hydrochlorofluorocarbon solvents that may be used to carry out the present invention include, but are not limited to, 3,3-dichloro-1,1,1,2,2-pentafluoropropane, 1,3-dichloro-1,1,2,2,3-pentafluoropropane, 1,1-dichloro-1-fluoroethane, etc., including mixtures thereof.

Examples of hydrofluoroether solvents that may be used to carry out the present invention include, but are not limited to, methyl nonafluorobutyl ether (HFE-7100), methyl nonafluoroisobutyl ether (HFE-7100), ethyl nonafluorobutyl ether (HFE-7200), ethyl nonafluoroisobutyl ether (HFE-7200), 1,1,2,2-tetrafluoroethyl-2,2,2-trifluoroethyl ether, etc., including mixtures thereof. Commercially available examples of this solvent include Novec 7100 (3M), Novec 7200 (3M).

Examples of volatile methylsiloxane solvents that may be used to carry out the present invention include, but are not limited to, hexamethyldisiloxane (OS-10, Dow Corning), octamethyltrisiloxane (OS-20, Dow Corning), decamethyltetrasiloxane (OS-30, Dow Corning), etc., including mixtures thereof.

Other siloxane solvents (e.g., NAVSOLVE™ solvent) that may be used to carry out the present invention include but are not limited to those set forth in U.S. Pat. No. 7,897,558.

In some embodiments, the wash liquid comprises an azeotropic mixture comprising, consisting of, or consisting essentially of a first organic solvent (e.g., a hydrofluorocarbon solvent, a hydrochlorofluorocarbon solvent, a hydrofluoroether solvent, a methylsiloxane solvent, or a combination thereof; e.g., in an amount of from 80 or 85 to 99 percent by weight) and a second organic solvent (e.g., a C1-C4 or C6 alcohol such as methanol, ethanol, isopropanol, tert-butanol, etc.; e.g., in an amount of from 1 to 15 or 20 percent by weight). Additional ingredients such as surfactants or chelants may optionally be included. In some embodiments, the azeotropic wash liquid may provide superior cleaning properties, and/or enhanced recyclability, of the wash liquid. Additional examples of suitable azeotropic wash liquids include, but are not limited to, those set forth in U.S. Pat. Nos. 6,008,179; 6,426,327; 6,753,304; 6,288,018; 6,646,020; 6,699,829; 5,824,634; 5,196,137; 6,689,734; and 5,773,403, the disclosures of which are incorporated by reference herein in their entirety.

When the wash liquid includes ingredients that are not desired for carrying into the further curing step, in some embodiments the initial wash with the wash liquid can be followed with a further rinsing step with a rinse liquid, such as water (e.g., distilled and/or deionized water), or a mixture of water and an alcohol such as isopropanol.

4. Further Curing.

After washing, the object is in some embodiments further cured, preferably by heating or baking.

Heating may be active heating (e.g., in an oven, such as an electric, gas, solar oven or microwave oven, heated bath, or combination thereof), or passive heating (e.g., at ambient (room) temperature). Active heating will generally be more rapid than passive heating and in some embodiments is preferred, but passive heating—such as simply maintaining the intermediate at ambient temperature for a sufficient time to effect further cure—is in some embodiments preferred.

In some embodiments, the heating step is carried out at at least a first (oven) temperature and a second (oven) temperature, with the first temperature greater than ambient temperature, the second temperature greater than the first temperature, and the second temperature less than 300° C. (e.g., with ramped or step-wise increases between ambient temperature and the first temperature, and/or between the first temperature and the second temperature).

For example, the intermediate may be heated in a stepwise manner at a first temperature of about 70° C. to about 150° C., and then at a second temperature of about 150° C. to 200 or 250° C., with the duration of each heating depending on the size, shape, and/or thickness of the intermediate. In another embodiment, the intermediate may be cured by a ramped heating schedule, with the temperature ramped from ambient temperature through a temperature of 70 to 150° C., and up to a final (oven) temperature of 250 or 300° C., at a change in heating rate of 0.5° C. per minute, to 5° C. per minute. (See, e.g., U.S. Pat. No. 4,785,075).

In some embodiments, the heating step is carried out in an inert gas atmosphere. Inert atmosphere ovens are known, and generally employ an atmosphere enriched in nitrogen, argon, or carbon dioxide in the oven chamber. Suitable examples include but are not limited to those available from Grieve Corporation, 500 Hart Road Round Lake, Ill. 60073-2898 USA, Davron Technologies, 4563 Pinnacle Lane, Chattanooga, Tenn. 37415 USA, Despatch Thermal Processing Technology, 8860 207th Street, Minneapolis, Minn. 55044 USA, and others.

In other embodiments, the heating step is carried out in an inert liquid bath. Suitable inert liquids may be aqueous liquids (i.e., pure water, salt solutions, etc.), organic liquids (e g., mineral oil, fluorinated, perfluorinated, and polysiloxane organic compounds such as perfluorohexane, perfluoro(2-butyl-tetrahydrofurane), perfluorotripentylamine, etc. (commercially available as PERFLUORINERT® inert liquids from 3M Company)), and mixtures thereof. These inert liquids can be deoxygenated if necessary, such as by bubbling an inert gas such as nitrogen through the liquid, by boiling the inert liquid, by mixing oxygen-scavenging agents with the inert liquid medium (or contacting them to one another), etc., including combinations thereof (see, e.g., U.S. Pat. No. 5,506,007).

In some embodiments, the further curing or heating step (whether carried out in a liquid or gas fluid) is carried out at an elevated pressure (e.g., elevated sufficiently to reduce volatilization or out-gassing of residual monomers, prepolymers, chain extenders, and/or reactive diluents, etc.). Suitable pressure ranges are from 10 or 15 psi to 70 or 100 psi, or more.

The present invention is explained in greater detail in the following non-limiting examples.

EXAMPLE 1

Materials and Abbreviations

The following materials or abbreviations are used in the Examples set forth below.

i) (meth)acrylate blocked polyurethane (ABPU)
ii) 1,6-diisocyanatohexane (HDI, Sigma Aldrich, 99%)
iii) stannous octoate (DABCO T-9, Evonik)
iv) zirconium dionate (K-KAT 4205, King Industries)
v) α-hydro-ω-hydroxypoly(oxy-1,4-butanediyl), MW~650 (poly(tetrahydrofuran))(PolyTHF 650, Sigma Aldrich)
vi) 4-methoxyphenol (MEHQ, Sigma Aldrich, 99%)
vii) 2-(tert-butylamino)ethyl methacrylate (BX-TBAEMA, Bimax)
viii) isobornyl methacrylate (SR423A, Sartomer)
ix) diphenyl(2,4,6-trimethylbenzoyl)phosphine oxide (TPO, PL Industries)
x) 4,4'-methylenebis(2-methylcyclohexylamine) (MACM, DKSH)
xi) Isocyanate group (NCO)

EXAMPLE 2

Tin-Catalyzed ABPU (ABPU-A)

In a reactor was added HDI (137.00 g) and the mixture was kept under dry air. The mixture was heated to 60° C. and the catalyst (DABCO T-9, 0.45 g) was added while mixing. PolyTHF 650 (240.70 g) was added drop-wise over 2 hours at 60° C. After 15 minutes at 60° C., the mixture was cooled down to 40° C. MEHQ (0.163 g) was added and mixed for 15 minutes. BX-TBAEMA (164.68 g) was added drop-wise over 2 hours and due to the resulting exotherm, the temperature was controlled between 40-50° C. The mixture was then stirred for 16 hours at 40° C. and the colorless product (ABPU-A) was collected, where the NCO remaining was <0.1% by ATR-IR spectroscopy. The resulting viscosity of ABPU-A at 25° C. was 51,900 cP (see Table 1).

EXAMPLE 3

Zirconium-Catalyzed ABPU (ABPU-B)

In a reactor was added HDI (279.97 g) and the mixture was kept under dry air. The mixture was heated to 60° C. and the catalyst (K-KAT 4205, 7.72 g) was added while mixing. PolyTHF 650 (492.00 g) was added drop-wise over 2 hours at 60° C. After 15 minutes at 60° C., the mixture was cooled down to 40° C. MEHQ (0.335 g) was added and mixed for 15 minutes. BX-TBAEMA (336.62 g) was added drop-wise over 3 hours and due to the resulting exotherm, the temperature was controlled between 40-50° C. The mixture was then stirred for 17 hours at 40° C. and the colorless product (ABPU-B) was collected, where the NCO remaining was <0.1% by ATR-IR spectroscopy. The resulting viscosity of ABPU-B at 25° C. was 33,000 cP (see Table 1).

TABLE 1

Parts of components added and resulting viscosities for ABPU-A and ABPU-B.

| Parts by Weight | ABPU-A | ABPU-B |
| --- | --- | --- |
| HDI | 2523 | 2523 |
| DABCO T-9 | 8.3 | — |
| K-KAT 4205 | — | 70 |
| PolyTHF 650 | 4432 | 4433 |
| MEHQ | 3.0 | 3.0 |
| BX-TBAEMA | 3033 | 3033 |
| Viscosity at 25° C. (cP) | 51900 | 33000 |

EXAMPLES 4-5

Part A Precursor Resin Formulation Procedures (RA-1 and RA-2)

To prepare the resin, TPO was dissolved by mixing in either ABPU-A (to produce RA-1) or ABPU-B (to produce RA-2). SR423A was then added and mixed to produce the resin Part A.

TABLE 2

Parts of components added and resulting viscosities for RA-1 and RA-2.

| Parts by weight | RA-1 | RA-2 |
| --- | --- | --- |
| ABPU-A | 68.68 | — |
| ABPU-B | — | 68.64 |
| SR423A | 30.00 | 30.00 |
| TPO | 1.30 | 1.30 |
| Viscosity at 25° C. (cP) | 4200 | 3170 |

EXAMPLES 6-7

Dual Cure Resin Formulation Procedure

Part A, either RA-1 (30.00 parts) or RA-2 (30.00 parts), was mixed with MACM (4.02 parts) to produce dual two cure resins for additive manufacturing: One containing the tin catalyst, the other containing the zirconium catalyst.

EXAMPLES 8-9

Additive Manufacturing of Objects from Tin Versus Zirconium-Containing Dual Cure Resins Resins prepared as described in Examples 6-7 are loaded onto the window cassette of a Carbon, Inc. M1 or M2 additive manufacturing apparatus, and objects are produced therefrom. The parts are washed on a Carbon, Inc. Smart Washer, and then baked at 120° C. for 12 hours to produce the final objects. Satisfactory performance during additive manufacturing is obtained with both resins, and satisfactory tensile properties are obtained in final objects produced from both resins.

The foregoing is illustrative of the present invention, and is not to be construed as limiting thereof. The invention is defined by the following claims, with equivalents of the claims to be included therein.

That which is claimed is:

1. A method of making a precursor resin useful for additive manufacturing, comprising the steps of:
    (a) reacting a polyisocyanate with a polyol in the presence of a zirconium catalyst to produce a first reaction product;

(b) reacting said first reaction product with an amine (meth)acrylate monomer blocking agent to produce a second reaction product comprising a (meth)acrylate blocked polyurethane (ABPU); and then (c) combining said second reaction product with (i) a free radical photoinitiator and (ii) optionally a comonomer, to produce said precursor resin.

2. The method of claim 1, wherein said method further comprises adding a radical polymerization inhibitor before, during or after any one of steps (a), (b) and (c).

3. The method of claim 1, wherein said method further comprises adding a reactive diluent or non-reactive diluent before, during or after any one of steps (a), (b) and (c).

4. The method of claim 1, wherein said reacting step (a) is carried out in the absence of a tin catalyst under nonaqueous conditions.

5. The method of claim 1, wherein said polyisocyanate comprises 1,6-diisocyanatohexane (HDI), methylene diphenyl diisocyanate (MDI), toluene diisocyanate (TDI)), paraphenyl diisocyanate (PPDI), 4,4'-dicyclohexylmethane-diisocyanate (HMDI), isophorone diisocyanate (IPDI), triphenylmethane-4,4'4"-triisocyanate, toluene-2,4,6-triyl triisocyanate, 1,3,5-triazine-2,4,6-triisocyanate, or ethyl ester L-lysine triisocyanate.

6. The method of claim 1, wherein said polyol comprises a polyether, polyester, or polybutadiene diol.

7. The method of claim 1, wherein said zirconium catalyst comprises zirconium tetraacetylacetonate or zirconium dionate.

8. The method of claim 2, wherein said radical polymerization inhibitor comprises 4-methoxyphenol (mequinol), 4-ethoxyphenol, 4-propoxyphenol, 4-butoxyphenol 4-heptoxyphenol, or 2,6-di-tert-butyl-4-methylphenol.

9. The method of claim 1, wherein said amine(meth) acrylate monomer blocking agent comprises tertiary-butylaminoethyl methacrylate (TBAEMA), tertiary pentylaminoethyl methacrylate (TPAEMA), tertiary hexylaminoethyl methacrylate (THAEMA), tertiary-butylaminopropyl methacrylate (TBAPMA), or an acrylate analog thereof.

10. The method of claim 1, wherein said photoinitiator is selected from the group consisting of: diphenyl(2,4,6-trimethylbenzoyl)phosphine oxide (TPO), diphenylphosphinyl (2,4,6-trimethylphenyl)methanone; benzophenone; substituted benzophenones; acetophenone; substituted acetophenones; benzoin; benzoin alkyl esters; xanthone; substituted xanthones; diethoxy-acetophenone; benzoin methyl ether; benzoin ethyl ether; benzoin isopropyl ether; diethoxyxanthone; chloro-thio-xanthone; N-methyl diethanol-amine-benzophenone; 2-hydroxy-2-methyl-1-phenyl-propan-1-one; 2-benzyl-2-(dimethylamino)-1-[4-(4-morpholinyl)phenyl]-1-butanone; and mixtures thereof.

11. The method of claim 1, wherein said comonomer of step (c) is present and comprises isobornyl methacrylate (IBOMA), lauryl methacrylate, or poly(ethylene glycol) dimethacrylate.

12. The method of claim 1, said precursor resin having a tin content of not more than 10, 100 or 200 ppm (parts per million), and a viscosity of 100 to 50,000 Centipoise at 25 degrees Centigrade.

* * * * *